United States Patent Office 3,701,687
Patented Oct. 31, 1972

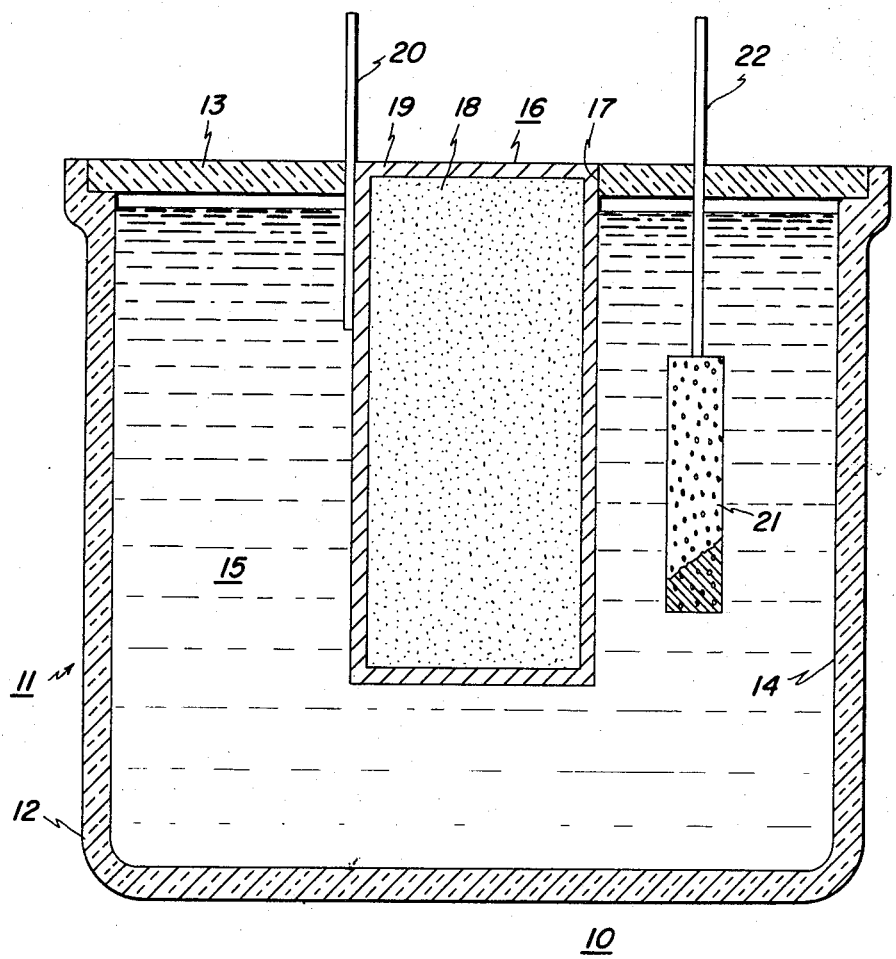

3,701,687
ELECTRODE CONTAINING A CATALYTIC COATING OF PLATINUM, PALLADIUM, AND A THIRD METAL AND FUEL CELL UTILIZING SAME
Willard T. Grubb, Schenectady, N.Y., and Robert Anthony Macur, Milwaukee, Wis., assignors to General Electric Company
Original application Aug. 29, 1968, Ser. No. 756,120, now Patent No. 3,573,992, dated Apr. 6, 1971. Divided and this application Apr. 27, 1970, Ser. No. 31,946
Int. Cl. H01m 13/00
U.S. Cl. 136—86 R                7 Claims

ABSTRACT OF THE DISCLOSURE

An electrode is described which has a catalytic coating of platinum, palladium, and a third less noble metal on a substrate. Such an electrode provides a high performance anode for electrochemical cells.

---

This application is a division of our copending application Ser. No. 756,120 filed Aug. 29, 1968, now U.S. Letters Patent 3,573,992, and assigned to the same assignee as the present application.

This invention relates to electrodes and, more particularly, to electrodes containing a catalytic coating of platinum, palladium, and a selected third metal on a substrate having at least a non-noble metal surface.

Noble metal catalysts, such as platinum, have been applied to a support material by applying an aqueous solution of an appropriate noble metal compound to the support material, drying, and reducing the dried material in flowing hydrogen at an elevated temperature. In previous practice of making platinum electrodes, the deposition of the noble metal is caused by the application of the direct current in which the substrate is connected to the negative terminal of a power supply. In U.S. Letters Patent 3,287,168 there is described the addition of a soluble lead compound to the aqueous platinum plating solution to increase the subsequent current density of the cell employing the electrode.

Our invention is directed to novel electrodes containing a catalytic coating of platinum, palladium, and a selected third metal on a substrate having at least a non-noble metal surface. Such electrodes are useful in various types of cells, such as electrochemical cells with at least one gas diffusion electrode, fuel cells, and metal-air cells. While the electrodes of our invention can be formed into a number of different types of electrode structures, each electrode should be one which: is electronically conductive, absorbs the electrochemical reactant, presents catalyst materials for the electrode reaction, and does not itself oxidize unduly under the operating conditions of the cell.

It is a primary object of our invention to provide an improved electrode which is particularly useful as an anode in an alkaline electrochemical cell.

It is a further object of our invention to provide such an improved electrode which is stable and has a long life when associated with a dissolved fuel in an alkaline electrolyte.

In accordance with one aspect of our invention, an electrode comprises a porous substrate with at least a metal surface thereon which is less noble than platinum and palladium, a catalytic coating on the substrate comprising platinum, palladium, and a third metal less noble than platinum and palladium, the palladium present in an amount from ten to ninety or from twenty-five to seventy-five weight percent of both the platinum and palladium, and the third metal present in an amount from ten to fifty weight percent of the total coating metals.

These and various other objects, features and advantages of the invention will be better understood from the following description taken in connection with the accompanying drawing in which:

The single figure is a sectional view of an electrochemical cell employing an anode electrode made in accordance with our invention.

In the single figure of the invention, there is shown generally at 10 an electrochemical cell which has a casing 11 including a body portion 12 with a closed bottom and an open top and a cover portion 13 which fits frictionally into the upper open end of body portion 12. Body portion 12 defines a chamber 14 in which there is provided for the operation of the cell a solution 15 of a combined alkaline electrolyte such as potassium hydroxide and a dissolved fuel such as methanol. A gas diffusion cathode electrode 16 has one end fitted into an aperture 17 in cover 13 of casing 11. In this manner, the upper surface of the cathode electrode is exposed to the atmosphere exterior of casing 11 while the remaining portion of the cathode extends downwardly into chamber 14. While a variety of electrodes can be employed, there is shown electrode 16 which has a porous carbon substrate 18 with a silver catalyst material 19 impregnated into and coating substrate 18. An electrical lead 20 is affixed to electrode 16 in any suitable manner.

An anode electrode 21, which is made in accordance with our invention, is positioned close to but spaced from cathode electrode 16 within chamber 14. While various suitable arrangements can be employed to support anode electrode 21, there is shown an electrical lead 22 for such support which is affixed to anode electrode 21 and extends upwardly through cover 13 of casing 11. If desired, an impervious mask (not shown) can cover or overlie porous cathode electrode 16 except for a portion of its surface which faces air or oxygen or is opposed to anode electrode 21.

When the cell is to be operated, a combined solution 15 comprising an alkaline electrolyte such as potassium hydroxide and an alcohol fuel is poured into chamber 14, cover portion 13 with attached cathode 16 and anode 21 is fitted frictionally into the upper open end of body portion 12, and leads 20 and 22 are connected to a suitable electrical load to generate electrical energy from the cell.

With the type of cell shown in the single figure the preferred solution 15 is a mixture of an aqueous alkaline electrolyte and a fuel of alcohol which is confined or stored in chamber 14. As is well understood in the art, the electrolyte may be an aqueous alkali solution of any desired concentration. While the alkali metal hydroxides are the most commonly employed and of the lowest cost, it is appreciated that other soluble hydroxides may be employed, such as tetra-substituted ammonium or phosphonium hydroxides. As used herein the term "alcohol"

includes methanol, ethanol, n-propanol, and isopropanol—that is, any alcohol having from 1 to 3 carbon atoms. Methanol is a preferred alcohol on the basis of cost and reactivity. Any desired quantity of alcohol may be utilized. It is preferred, however, that the relation of hydroxyl ions to alcohol be maintained in a molar ratio that insures that all the alcohol will be consumed during extended operation of the unit. Other fuels are also suitable such as ethylene glycol, glycerol, sugars including glucose, fructose and sucrose, potassium formate, alkali salts of lactic acid or glycolic acid, etc. If desired, a large storage chamber for the electrolyte and fuel can be provided by enlarging chamber 14 beneath the electrodes. In this manner, the fuel capacity of the cell is increased without in any way penalizing performances of the cell.

We discovered unexpectedly that we can form a unique electrode which is particularly useful as an anode in an alkaline electrolyte electrochemical cell. Our electrode is very suitable in electrolytes of an aqueous alkali solution, an aqueous bicarbonate solution, or an aqueous carbonate solution. Further, this electrode operates quite satisfactorily over a long period when a dissolved fuel of alcohol, ethylene glycol, glycerol, a sugar, potassium formate or alkali salts of lactic acid or glycolic acid is mixed with the electrolyte.

We found that our electrode can be formed from porous metallic or non-metallic substrates which have at least a coating of metal which is less noble than platinum and palladium. While we prefer to employ a nickel foam with 95 to 97% porosity or a nickel plaque with about 50% porosity as the substrate, other metallic or non-metallic substrates in various porous configurations can be used. For example, suitable substrates include carbon with a nickel coating thereon, or other metals in the form of a screen or expanded metal with a coating of nickel, iron or cobalt thereon.

We found that the substrate can be contacted with a solution containing platinum, palladium and a selected third metal, for example, by immersion therein. The metals from this solution deposit on the substrate as catalytic material to form an improved electrode. We found that we can immerse the substrate in the above type of solution to deposit the metals thereon, immerse the substrate in such a solution and remove from contact with the solution into air or oxygen at identical successive intervals of from five to fifteen seconds of each minute of contact, thereby having in effect a dipping method, or immerse the substrate in the above type of solution and applying a constant D.C. current between the substrate and an indifferent electrode isolated by an ionically conducting diffusion barrier by connecting the substrate to the positive terminal of a power supply and by connecting the counter electrode to the negative terminal of the same power source with the constant current in the range of three milliamperes to thirty milliamperes per square centimeter of geometri carea. Of these methods, we prefer the immersion of the substrate in the solution and applying a constant D.C. current since this method provides the best results in the formation of a stable, long-life electrode which is more active subsequently when employed in a cell.

The above solution comprises platinum, palladium, and a selected third metal. The solution is formed by mixing together a platinum solution, such as platinum chloride or chloroplatinic acid, and a palladium solution, such as palladous chloride. The third metal, which can be selected from a wide variety of metals is added to the above mixture in the form of a metallic salt. Suitable metals include thallium, cadmium, gold, lead, copper, nickel, indium, manganese, mercury and cobalt. Suitable salts include thallous acetate, cadmium acetate, gold chloride, lead acetate, lead acetate trihydrate, cupric acetate, nickel acetate, indium trichloride, ferric acetate, manganous acetate, mercuric acetate, cobaltous acetate.

We discovered that the superior performance was obtained from an electrode made in accordance with our invention when it was subsequently employed in an electrochemical cell having an alkaline electrolyte and a fuel other than a formate. This electrode was prepared by immersing a porous nickel foam into a solution containing platinum chloride, and palladium chloride in which the platinum and palladium were present each as fifty weight parcent, and lead acetate trihydrate in which the lead was present in an amount of thirty-three weight percent of the coating metals. While other soluble lead salts with an indifferent anion could be employed, the lead acetate trihydrate gave the best results. During the immersion of the substrate in the above solution at room temperature, a constant D.C. current was applied between the substrate and an indifferent electrode isolated by an ionically conducting diffusion barrier by connecting the substrate to the positive terminal of a power supply and by connecting the counter electrode to the negative terminal of the same power source, and the optimum constant current was thirteen milliamperes per square centimeter of geometric area. However, very desirable results were obtained over a range of three milliamperes to thirty milliamperes per square centimeter of geometric area. Such area is defined as the geometric area of one of the major faces of the electrode.

In the preparation and assembly of electrodes made in accordance with our invention, a substrate of nickel foam with 97% porosity was precleaned by immersion in 6NHCl for about one minute or until hydrogen bubbles appeared on its surface. The foam substrate was the rinsed in distilled water for a few seconds and kept under distilled water until transferred to the deposition cell. A deposition solution was prepared by mixing palladous chloride and chloroplatinic acid in which the platinum and palladium were present each as fifty weight percent, and lead acetate trihydrate in which the lead was present in an amount of thirty-three weight percent of the coating metals. Sixteen milligrams of lead acetate trihydrate were added to the solution of palladous chloride and chloroplatinic acid providing 8.7 milligrams of lead in the 80 milliliter deposition solution. A constant D.C. current of thirteen milliamperes per square centimeter of geometric area was applied between the substrate and an indifferent electrode isolated by an ionically conducting diffusion barrier by connecting the substrate to the positive terminal of a power supply and by connecting the counter electrode to the negative terminal of the same power source. The deposition was continued for 15 minutes at room temperature. Essentially complete deposition of the noble metals resulted. While room temperature condition was employed, suitable temperatures are in a range from 0° C. to 80° C. At the end of this period of time, the completed electrode was removed from the deposition solution which electrode contained 1.5 milligrams of platinum per square centimeter, 1.5 milligrams of palladium per square centimeter, and about 1.5 milligrams of lead per square centimeter.

This electrode was subsequently employed in an electrochemical half cell having an electrolyte of 6N potassium hydroxide and a fuel of 4 M methanol, which cell was operated at 25° C. The rest potential of the cell was +0.014 volt. This half cell exhibited 1,150 milliamperes per 3.23 square centimeters at 0.3 volt positive to a hydrogen reference electrode in the same solution.

Examples of electrodes which were not formed in accordance with our invention are set forth below in Examples 1–5 while examples of electrodes which were formed in accordance with our invention are set forth in Examples 6–7.

EXAMPLES 1–5

Each of the electrodes for Examples 1–5 were formed from a nickel plaque with about 50% porosity which had dimensions of ½ inch x 1 inch x 0.018 inch. A nickel lead wire was spot-welded to each plaque, after which it was coated on one side with polyethylene by pressing the plaque against a 0.004 inch polyethylene film at 130° C. under pressure of 5 p.s.i. Each partially coated plaque was then cleaned by dipping it into a solution of 6NHCl for about one second and rinsing it briefly in distilled water. Separate 80 ml. solutions were prepared each of which contained 9.69 mg. of noble metal so as to provide 3.0 mg./cm.$^2$ noble metal loading on the electrode. Platinum chloride and palladium chloride provided the noble metal in the solution while 0.2 gram per liter of lead acetate trihydrate furnished the lead in the solution.

The metal loading for the electrodes in the solutions for Examples 1–5 are set forth below in Table I.

TABLE I

| Example | Platinum loading, mg./cm.$^2$ | Palladium loading, mg./cm.$^2$ | Lead 0.2 g./l. |
|---|---|---|---|
| 1 | 3.0 | None | None. |
| 2 | None | 3.0 | Yes. |
| 3 | 3.0 | None | Yes. |
| 4 | None | 3.0 | None. |
| 5 | 1.5 | 1.5 | Do. |

The plaques were immersed in solutions 1–5, respectively. The deposition of the metal onto each plaque was followed by measuring pH which began at about 2 and rose to about 7 after complete removal of noble metal and HCl from the solution by nickel replacement. The plaques were immersed from 1 to 5 hours at room temperature with moderate stirring in a beaker open to the air. Each plaque became coated with a velvety black deposit on its uncoated face thereby forming an electrode.

EXAMPLES 6–7

The electrodes for Examples 6 and 7 were formed with the same plaques and in the same manner as the electrodes in Examples 1–5. However, the metal loading for the electrodes in the solution for Example 6 was 1.5 mg./cm.$^2$ platinum and 1.5 mg./cm.$^2$ palladium and in the solution for Example 1 was 0.75 mg./cm.$^2$ platinum and 2.25 mg./cm.$^2$ palladium. Each solution contained 0.2 g./l. lead acetate trihydrate. Each plaque became coated with a velvety black deposition on its uncoated face thereby forming an electrode.

The electrodes of Examples 1–7 were tested as methanol anodes in an aqueous solution of 6 M methanol and 13 M KOH hydroxide using a half cell of conventional design. A luggin capillary positioned behind the test electrode provided communication with the reversible hydrogen reference electrode. A hydrogen fuel cell electrode served as the counter electrode in the cell. Protection against hydrogen diffusion was provided by fritted glass separators between the working electrode compartment and the reference and counter electrode compartments. The absence of any appreciable effect from hydrogen or nickel oxidation was found by testing an unactivated nickel plaque which had been prepared in the manner described above. Anode performance was measured by setting the anode at a fixed potential controlled by a potentiostat and measuring the anodic current after 10 minutes at the fixed potential. Little further change was observed after some hours on selected load points, and this confirmed that 10 minute points closely approximate steady state for the anode reaction.

The performance of the electrodes from Examples 1–7 was measured as total anodic current in milliamperes per 3.23 cm.$^2$ of geometric area as a function of the overvoltage in volts of the anode against the hydrogen reference electrode. This performance at room temperature is set forth below in Table II.

TABLE II

| Electrode Examples | Milliamperes | | | | | | |
|---|---|---|---|---|---|---|---|
| | 1 | 2 | 3 | 4 | 5 | 6 | 7 |
| Overvoltage: | | | | | | | |
| 0.075 | | | | | | | 2 |
| 0.1 | | | | | | | 4 |
| 0.15 | | | | | | 8 | 22 |
| 0.2 | | | | 0.3 | 0.2 | 40 | 80 |
| 0.25 | | | 10 | 2.0 | 0.3 | 80 | 180 |
| 0.3 | 4.0 | 14 | 20 | 7.2 | 1.4 | 160 | 290 |

High current at low overvoltage denotes superior anode performance as shown by electrodes of Examples 6 and 7 which were made in accordance with our invention.

The following examples set forth additional electrodes made in accordance with our invention.

EXAMPLES 8–34

Each of the electrodes for Examples 8–34 were formed from a nickel foam with 97% porosity which had dimensions of 1 inch x ½ inch x 3/16 inch. A nickel lead wire was attached by forcing it in fish-hook fashion through the foam. The foam was precleaned by immersion in 6NHCl for about one minute or until hydrogen bubbles appeared on its surface. Each foam substrate was then rinsed in distilled water for a few seconds and kept under distilled water until transferred to the deposition cell. Each deposition solution was prepared by mixing palladous chloride, chloroplatinic acid and lead acetate trihydrate. Each solution contained the amount of platinum and palladium which is set forth below in Table III in milligrams per square centimeter. Each solution contained 80 milliliters except for Examples 15–18 which contained 500, 500, 400 and 800 milliliters, respectively. The deposition time for each electrode was 15 minutes at room temperature.

Lead acetate trihydrate was added in the amount of 16 milligrams per 80 milliliters of solution except in Examples 15–18. In Examples 8–11 the foam substrate was immersed in the solution and removed from the solution for equal time periods. Example 11 was also subjected to hydrogen when removed from the solution. In Examples 12–14, the foam substrate was removed from the solution for 10 seconds out of each minute. In Examples 19 and 20, a constant D.C. current as described previously in a range of 20–45 milliamperes was applied during the deposition. In Examples 21–34, a constant D.C. current as described previously of 40 milliamperes was applied during each deposition. In Examples 27–34, the amount of palladium was decreased from 90% to 20%.

The electrodes of these Examples 8–34 were then tested as described above in Examples 1–7. The results of these tests are set forth below in Table IV.

TABLE III

| Example number | Platinum, mg./cm.$^2$ | Palladium mg./cm.$^2$ |
|---|---|---|
| 8 | 0.75 | 2.25 |
| 9 | 0.75 | 2.25 |
| 10 | 0.75 | 2.25 |
| 11 | 0.75 | 2.25 |
| 12 | 0.75 | 2.25 |
| 13 | 0.75 | 2.25 |
| 14 | 0.75 | 2.25 |
| 15 | 0.75 | 2.25 |
| 16 | 0.75 | 2.25 |
| 17 | 0.75 | 2.25 |
| 18 | 0.75 | 2.25 |
| 19 | 0.75 | 2.25 |
| 20 | 0.75 | 2.25 |
| 21 | 0.75 | 2.25 |
| 22 | 0.75 | 2.25 |
| 23 | 0.75 | 2.25 |
| 24 | 0.75 | 2.25 |
| 25 | 0.75 | 2.25 |
| 26 | 0.75 | 2.25 |
| 27 | 0.30 | 2.70 |
| 28 | 0.601 | 2.399 |
| 29 | 0.9 | 2.1 |
| 30 | 1.2 | 1.8 |
| 31 | 0.5 | 1.5 |
| 32 | 1.8 | 1.2 |
| 33 | 2.1 | 0.9 |
| 34 | 2.399 | 0.601 |

TABLE IV

| Example number | Rest potential (volts vs. $H_2$ ref.) | ma./anode, area 3.23 cm.$^2$, in 6 M $CH_3OH$ 13 N KOH at room temp. at indicated overvoltage | | | | |
|---|---|---|---|---|---|---|
| | | 0.10 | 0.15 | 0.20 | 0.25 | 0.30 |
| 8 | 0.095 | 0.2 | ------ | 4.5 | ------ | 40.0 |
| 9 | 0.06 | .8 | 6.1 | 25.1 | 74.2 | 168 |
| 10 | 0.05 | 1.4 | 15.0 | 59.4 | 136.2 | 236 |
| 11 | ------ | ------ | ------ | ------ | ------ | ------ |
| 12 | 0.07 | 2.7 | 25.5 | 105.0 | 241.0 | ------ |
| 13 | 0.09 | 2.4 | 25.5 | 112.0 | 260.0 | ------ |
| 14 | 0.09 | 1.3 | 11.7 | 49.0 | 119.2 | 216.0 |
| 15 | 0.06 | 0.2 | 1.3 | 6.0 | 15.0 | 22.1 |
| 16 | 0.06 | 0.3 | ------ | 5.0 | 13.0 | 47.0 |
| 17 | 0.08 | 1.0 | 11.3 | 56.0 | 156.0 | 300.0 |
| 18 | 0.09 | 1.0 | 11.0 | 54.0 | 142.0 | 270.0 |
| 19 | 0.09 | 2.3 | 24.8 | 106.0 | 245.0 | ------ |
| 20 | 0.06 | 2.29 | 24.5 | 102.4 | 237.5 | ------ |
| 21 | 0.08 | 2.3 | 23.4 | 100.0 | 234.0 | ------ |
| 22 | 0.08 | ------ | 21.5 | 107.0 | 250.0 | ------ |
| 23 | 0.06 | 1.75 | 19.0 | 86.3 | 195.0 | ------ |
| 24 | 0.05 | 1.75 | 17.5 | 78.9 | 204.0 | 340.0 |
| 25 | 0.09 | 1.5 | 17.8 | 84.0 | 185.0 | 337.5 |
| 26 | 0.00 | 3.0 | 26.8 | 106.0 | 237.5 | ------ |
| 27 | 0.09 | 1.4 | 13.9 | 62.5 | 162.0 | 306.0 |
| 28 | 0.07 | 2.7 | 24.8 | 94.2 | 225.0 | ------ |
| 29 | 0.05 | 4.6 | 43.8 | 159.8 | 325.0 | ------ |
| 30 | 0.06 | 6.1 | 45.0 | 156.0 | 318.0 | ------ |
| 31 | 0.07 | 5.7 | 48.0 | 163.0 | 332.0 | ------ |
| 32 | 0.06 | 5.2 | 40.5 | 130.0 | 270.0 | ------ |
| 33 | 0.05 | 5.0 | 42.0 | 152.0 | 317.0 | ------ |
| 34 | 0.06 | 5.2 | 40.3 | 140.0 | 275.0 | ------ |

As it is shown by above Examples 12–14, our method of dipping or immersing the substrate in the particular solution and removing it at regular, specific intervals produced good performance while the removal of the substrate from the solution as shown in Examples 8–9 produced poorly performing electrodes. Examples 15–18 show that the lead concentration is about optimal at 0.2 g./l. lead acetate trihydrate. Examples 19 and 20 show improved electrodes by the application of a constant D.C. current as described previously with a range of 20 to 45 ma./3.23 cm.$^2$ electrode. Examples 21–34 show the good performance of tthe electrode which were prepared including an applied constant D.C. current as described previously of 40 ma./3.23 cm.$^2$ electrode. Examples 27–34 showed further the best performance when the platinum to palladium ratio was 1 to 1 or the weight percent of these metals was each fifty weight percent.

Examples 35–48

Each of the electrodes for Examples 35–48 were formed from a nickel foam with 97% porosity which had dimensions of 1 inch x ½ inch x 3/16 inch. A nickel lead wire was attached by forcing it through the foam. The foam was precleaned by immersion in 6NHCl for about one minute or until hydrogen bubbles appeared on its surface. Each foam substrate was then rinsed in distilled water for a few seconds and kept under distilled water until transferred to the deposition cell.

Each deposition solution was prepared by mixing palladous chloride and chloroplatinic acid. A specific third metal salt which is set forth below in Table V was added to each deposition solution of 80 milliliters with the exception of Example 35 which contained no added salt. Each solution mixture contained a ratio of 3 to 1 of palladium to platinum except in Examples 40 and 47. These examples contained a 1 to 1 ratio. The noble metal loading of each electrode was 3.0 mg./cm.$^2$. The deposition time for each electrode was 15 minutes at room temperature. Each third metal salt was added in the amount of 16 milligrams. In each of the examples, a constant D.C. current as described previously of 40 milliamperes was applied during each deposition.

The electrodes of Examples 35–48 were then tested as described above in Examples 1–34. The results of these tests are set forth below in Table VI.

TABLE V

| Example No. | Third metal salt (0.2 g./l. of metal salt) |
|---|---|
| 35 | No added salt. |
| 36 | Thallous acetate. |
| 37 | Cadmium acetate. |
| 38 | Gold chloride. |
| 39 | Lead acetate trihydrate. |
| 40 | Lead acetate trihydrate. |
| 41 | Cupric acetate. |
| 42 | Nickel acetate $4H_2O$. |
| 43 | Indium trichloride. |
| 44 | Ferric acetate. |
| 45 | Manganous acetate. |
| 46 | Mercuric acetate. |
| 47 | Mercuric acetate. |
| 48 | Cobaltous acetate. |

TABLE VI

| Example number | Rest potential (volts vs. $H_2$ ref.) | ma./anode, area 3.23 cm.$^2$, in 4 M $CH_3$ OH 6 N KOH at room temperature at indicated overvoltage | | | | | | | |
|---|---|---|---|---|---|---|---|---|---|
| | | 0.05 v. | 0.10 v. | 0.15 v. | 0.20 v. | 0.25 v. | 0.30 v. | 0.35 v. | 0.40 v. |
| 35 | +0.078 | 0 | 0 | 0 | 0.2 | 0.34 | 0.8 | 3.0 | 8.0 |
| 36 | +0.049 | ------ | 0.9 | 4.5 | 17.0 | 50.0 | 120.0 | 230.0 | ------ |
| 37 | +0.037 | ------ | ------ | 0.6 | 1.6 | 5.4 | 14.0 | 38.0 | ------ |
| 38 | +0.50 | ------ | ------ | ------ | 0.2 | 0.8 | 3.7 | 15.0 | 54.0 |
| 39 | +0.14 | 0.1 | 1.2 | 13.5 | 74.0 | 244.0 | 640.0 | ------ | ------ |
| 40 | +0.014 | 1.0 | 4.6 | 43.0 | 200.0 | 550.0 | 1,150.0 | ------ | ------ |
| 41 | +0.026 | 0.2 | 1.4 | 1.4 | 3.2 | 7.2 | 18.0 | 40.0 | ------ |
| 42 | +0.08 | ------ | ------ | 0.05 | 0.2 | 0.8 | 2.8 | 8.4 | 32.5 |
| 43 | +0.005 | 0.15 | 0.3 | 1.0 | 3.8 | 83. | 20.0 | 37.0 | ------ |
| 44 | +0.090 | ------ | ------ | ------ | 0.2 | 0.7 | 2.0 | 11.0 | 32.0 |
| 45 | +0.050 | ------ | ------ | ------ | 0.3 | 2.0 | 6.5 | 16.5 | 50.0 |
| 46 | +0.055 | ------ | 0.2 | 1.0 | 4.6 | 21.0 | 80.0 | 250.0 | ------ |
| 47 | +0.013 | ------ | 0.3 | 4.8 | 26.0 | 110.0 | 380.0 | 1,000.0 | ------ |
| 48 | +0.086 | ------ | ------ | 0.1 | 0.35 | 0.80 | 3.0 | 9.5 | 33.0 |

As it is shown above, our method of preparation produced electrodes with superior performance. Example 40 shows further improvement over Example 39 while Example 47 shows further improvement over Example 46. Examples 40 and 47 employ a ratio of palladium to platinum of 1 to 1.

EXAMPLES 49–62

Each of the electrodes for Examples 49–62 were formed from a nickel foam with 97% porosity which had dimensions of 1 inch x ½ inch x 3/16 inch. A nickel lead wire was attached by forcing it through the foam. The foam was precleaned by immersion in 6NHCl for about one minute or until hydrogen bubbles appeared on its surface. Each foam substrate was then rinsed in distilled water for a few seconds and kept under distilled water until transferred to the deposition solution.

Each deposition solution was prepared by mixing palladous chloride and chloroplatinic acid. A specific third metal salt, which is set forth below in Table VII, was added to each deposition solution of 80 milliliters with the exception of Example 49 which contained no third metal salt. Each solution contained a ratio of 3 to 1 of palladium to platinum except in Examples 54 and 61. These examples contained a 1 to 1 ratio. The noble metal loading of each electrode was 3.0 mg./cm.$^2$. The deposition time for each electrode was 15 minutes at room temperature. Each third metal salt was added in the amount of 16 milligrams. In each of the examples, a constant D.C. current as described previously of 40 milliamperes was applied during each deposition.

The electrodes of Examples 49–65 were then tested as described above in Examples 1–48. The results of these tests are set forth below in Table VIII.

TABLE VII

| Example No. | Third metal salt (0.2 g./l. of metal salt) |
|---|---|
| 49 | No added salt. |
| 50 | Thallous acetate. |
| 51 | Cadmium acetate. |
| 52 | Gold chloride. |
| 53 | Lead acetate trihydrate. |
| 54 | Lead acetate trihydrate. |
| 55 | Cupric acetate. |
| 56 | Nickel acetate $4H_2O$. |
| 57 | Indium trichloride. |
| 58 | Ferric acetate. |
| 59 | Manganous acetate. |
| 60 | Mercuric acetate. |
| 61 | Mercuric acetate. |
| 62 | Cobaltous acetate. | seconds and kept under distilled water until transferred to the deposition cell.

Each deposition solution was prepared by mixing palladous chloride, chloroplatinic acid, and lead acetate trihydrate. Each deposition solution, which contained 80 milliliters, had a ratio of 1 to 1 of palladium to platinum. The noble metal loading of each electrode was 3.0 mg./cm.$^2$ The deposition time for each electrode was 15 minutes resulting in substantially complete deposition of the noble metals. The lead acetate trihydrate salt was added in the amount of 16 milligrams per 80 milliliters. In each of the examples, a constant D.C. current as described previously of 40 milliamperes was applied during each deposition.

The electrodes of Examples 63–77 were then tested as described above in Examples 1–62. The results of these tests are set forth below in Table IX. The electrolyte for Examples 63–71 was 6M KOH while the electrolyte for Examples 72—77 was saturated potassium bicarbonate.

As it will be seen from the above Table IX, the above electrodes provided unique performance when employed

TABLE VIII

| Example number | Rest Potential (volts vs. $H_2$ ref.) | ma./anode, area 3.23 cm.$^2$, in 4 M potassium formate 6 N KOH at room temperature at indicated overvoltage | | | | | | | |
|---|---|---|---|---|---|---|---|---|---|
| | | 0.05 v. | 0.10 v. | 0.15 v. | 0.20 v. | 0.25 v. | 0.30 v. | 0.35 v. | 0.40 v. |
| 49 | −0.008 | | | | 4.0 | 22.0 | 88.0 | 300.0 | 750.0 |
| 50 | +0.130 | | | 0.1 | 0.7 | 2.7 | 7.2 | 12.0 | |
| 51 | +0.003 | 1.0 | 1.0 | 7.5 | 38.0 | 140.0 | 320.0 | 750.0 | |
| 52 | +0.005 | 0.7 | 1.0 | 4.0 | 13.0 | 44.0 | 170.0 | | |
| 53 | +0.130 | | | 0.3 | 1.8 | 7.5 | 17.0 | 35.5 | 56.0 |
| 54 | +0.130 | 0.1 | 0.9 | 6.0 | 22.0 | 37.0 | 63.0 | 94.0 | 120.0 |
| 55 | +0.049 | | 0.8 | 17.5 | 66.0 | 145.0 | 285.0 | | |
| 56 | +0.093 | | | 1.0 | 6.0 | 29.0 | 105.0 | 320.0 | |
| 57 | +0.061 | | 0.1 | 0.46 | 2.2 | 6.6 | 17.0 | 46.0 | 140.0 |
| 58 | +0.098 | | | 0.5 | 4.0 | 22.5 | 105.0 | 380.0 | |
| 59 | +0.067 | | | 2.2 | 19.0 | 62.0 | 220.0 | | |
| 60 | +0.012 | 0.5 | 2.0 | 10.0 | 38.0 | 160.0 | 580.0 | | |
| 61 | +0.066 | | 0.1 | 0.4 | 2.0 | 14.0 | 62.0 | 300.0 | 760.0 |
| 62 | +0.103 | | | 0.4 | 3.1 | 20.0 | 86.0 | 350.0 | |

TABLE IX

| Example number | Fuel | Rest potential (volts vs. $H_2$ ref.) | Ma./anode, area 3.23 cm.$^2$, in fuel in electrolyte at room temperature at indicated overvoltage | | | | | | | |
|---|---|---|---|---|---|---|---|---|---|---|
| | | | 0.05 v. | 0.10 v. | 0.15 v. | 0.20 v. | 0.25 v. | 0.30 v. | 0.35 v. | 0.40 v. |
| 63 | 4 M methanol | −0.041 | 1.0 | 4.6 | 43.0 | 200.0 | 550.0 | | | |
| 64 | 2 M ethanol | −0.003 | 3.2 | 14.0 | 42.0 | 113.0 | 241.0 | | | |
| 65 | 2 M ethylene glycol | −0.019 | 2.1 | 20.0 | 91.0 | 235.0 | | | | |
| 66 | 63 g./l. glucose | −0.030 | 10.5 | 38.8 | | 160.0 | 287.0 | | | |
| 67 | 63 g./l. sucrose | +0.024 | 0.0 | 0.5 | 8.0 | 50.8 | 133.0 | | | |
| 68 | 2 M glycerol | −0.039 | 1.0 | 11.3 | 60.0 | 161.0 | 300.0 | | | |
| 69 | 2 M potassium glycolate | −0.050 | 8.2 | 23.0 | 50.0 | 105.0 | 190.0 | | | |
| 70 | 200 g./l. fructose | −0.053 | 26.0 | 39.0 | 72.0 | 105.0 | 140.0 | | | |
| 71 | 2 M potassium lactate | −0.028 | | 23.0 | 60.0 | 120.0 | 210.0 | | | |
| 72 | 63 g./l. glucose | +0.038 | 0.6 | 4.2 | 17.0 | 29.4 | 57.6 | 83.2 | | |
| 73 | 2 M ethanol | +0.014 | 0.0 | 0.0 | 0.0 | 2.1 | 10.1 | 24.9 | 45.1 | |
| 74 | 6 M methanol | −0.016 | | 4.6 | | 50.0 | 80.0 | 170.0 | 220.0 | 260.0 |
| 75 | 2 M ethylene glycol | +0.133 | 0 | 0.0 | 2.0 | 15.0 | 53.0 | 260.0 | | |
| 76 | 63 g./l. sucrose | | | | | 0.4 | 2.5 | 4.2 | | |
| 77 | 2 M glycerol | +0.113 | | | 0.8 | 8.6 | 34.0 | 63.0 | | |

As it is shown above in Examples 49–62, when potassium formate is employed as the fuel the higher ratio of 3 palladium to 1 platinum produced the superior electrodes. Third metals, which were effective, are a group consisting of cadmium, gold, copper, nickel, iron, manganese and mercury.

EXAMPLES 63–77

Each of the electrodes for Examples 63–77 were formed from a nickel foam with 97% porosity which had dimensions of 1 inch x ½ inch x ³⁄₁₆ inch. A nickel lead wire was attached by forcing it through the foam. The foam was precleaned by immersion in 6NHCl for about one minute or until hydrogen bubbles appeared on its surface. Each foam substrate was then rinsed in distilled water for a few with a potassium hydroxide or a potassium bicarbonate electrolyte and dissolved fuels of alcohols, sugars, glycerol, ethylene glycol, and alkali salts of lactic acid or glycolic acid.

While other modifications of the invention and variations thereof which may be employed within the scope of this invention have not been described, the invention is intended to include such as may be embraced within the following claims:

What we claim as new and desire to secure by Letters Patent of the United States is:

1. An electrode comprising a porous substrate with at least a metal surface less noble than platinum and palladium, a catalytic coating on the substrate consisting of platinum, palladium, and a third metal less noble than platinum and palladium, the palladium present in an amount from ten to ninety weight percent of both the platinum and palladium, and the third metal present in an amount of ten to fifty weight percent of the total coating metals.

2. In an electrode as in claim 1, in which the palladium is present in an amount from twenty-five to seventy-five weight percent of both the platinum and palladium, and the third metal is present in an amount of twenty to forty weight percent of the total coating metals.

3. In an electrode as in claim 1, in which the porous substrate is nickel foam with ninety-five to ninety-seven percent porosity.

4. In an electrode as in claim 1, in which the porous substrate is a nickel plaque with fifty percent porosity.

5. In a fuel cell comprising a cathode, an alkaline electrolyte solution, and a fuel dissolved in the electrolyte solution, the fuel selected from the group consisting of alcohols, sugars, glycerol, ethylene glycol, and alkali salts of lactic acid and glycolic acid, the combination of an anode comprising a porous substrate with at least a metal surface less noble than platinum and palladium, a catalytic coating on the substrate consisting of platinum, palladium, and a third metal less noble than platinum and palladium, the palladium present in an amount from ten to ninety weight percent of both the platinum and palladium, and the third metal present in an amount of ten to fifty weight of the total weight percent of the coating metals.

6. In a fuel cell as in claim 5, in which the porous substrate is nickel foam with 95 to 97 percent porosity.

7. In a fuel cell as in claim 5, in which the porous substrate is a nickel plaque with fifty percent porosity.

References Cited

UNITED STATES PATENTS

| | | | |
|---|---|---|---|
| 3,461,044 | 8/1969 | Lyons, Jr., et al. | 136—120 X |
| 3,183,123 | 5/1965 | Haworth | 136—86 |
| 2,917,384 | 12/1959 | Grandey | 75—20 X |
| 3,276,909 | 10/1966 | Moos | 136—86 |
| 3,454,429 | 7/1969 | Gruber | 136—86 |
| 3,212,930 | 10/1965 | Thompson et al. | 136—120 X |
| 3,276,976 | 10/1966 | Juliard | 136—120 X |
| 3,287,168 | 11/1966 | Marsh | 136—86 |
| 3,291,753 | 12/1966 | Thompson | 252—447 |

ANTHONY SKAPARS, Primary Examiner

U.S. Cl. X.R.

136—120 FC